United States Patent
Schultz et al.

(10) Patent No.: US 10,650,157 B2
(45) Date of Patent: May 12, 2020

(54) SECURING VIRTUAL EXECUTION ENVIRONMENTS

(71) Applicant: Microsoft Technology Licensing, LLC, Redmond, WA (US)

(72) Inventors: Benjamin M. Schultz, Bothell, WA (US); Kinshumann, Redmond, WA (US); David John Linsley, Seattle, WA (US); Charles Glenn Jeffries, Sammamish, WA (US); Giridhar Viswanathan, Redmond, WA (US); Scott Daniel Anderson, Seattle, WA (US); Frederick J. Smith, Redmond, WA (US); Hari R. Pulapaka, Redmond, WA (US); JianMing Zhou, Sammamish, WA (US); Margarit Simeonov Chenchev, Sammamish, WA (US); David B. Probert, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 15/582,741

(22) Filed: Apr. 30, 2017

(65) Prior Publication Data
US 2018/0314846 A1     Nov. 1, 2018

(51) Int. Cl.
G06F 9/455 (2018.01)
G06F 21/62 (2013.01)
G06F 21/57 (2013.01)

(52) U.S. Cl.
CPC ...... *G06F 21/6218* (2013.01); *G06F 9/45558* (2013.01); *G06F 21/575* (2013.01); *G06F 2009/45587* (2013.01)

(58) Field of Classification Search
CPC .................................................. G06F 9/45558
See application file for complete search history.

(56) References Cited

U.S. PATENT DOCUMENTS 8,381,284 B2   2/2013   Dang et al.
9,355,246 B1   5/2016   Wan et al.
(Continued)

FOREIGN PATENT DOCUMENTS

WO   2016081867 A1   5/2016

OTHER PUBLICATIONS

"Understanding Container Security", https://docs.cloudfoundry.org/concepts/container-security.html, Retrieved on: Mar. 23, 2017, 3 pages.
(Continued)

*Primary Examiner* — Charlie Sun

(57) ABSTRACT

Facilities are provided to secure guest runtime environments (GREs). Security policy specifications may be associated with GREs. A GRE's security policy may be specific to the GRE and may also include security policy inherited from higher levels such as a host operating environment. The security policy of a GRE specifies restrictions and/or permissions for activities that may be performed within the scope of execution of the GRE. A GRE's security policy may limit what the GRE's guest software may do within the GRE. Restrictions/permissions may be applied to objects such as files, configuration data, and the like. Security specifications may be applied to execution initiated within a GRE. A GRE's security specification may restrict/permit executable objects from loading and executing within the GRE. The executability or accessibility of objects may be conditioned on factors such as the health/integrity of the GRE, the host system, requested files, and others.

20 Claims, 7 Drawing Sheets

(56) References Cited

U.S. PATENT DOCUMENTS

| | | |
|---|---|---|
| 9,397,905 B1 | 7/2016 | Moniz et al. |
| 9,521,115 B1 | 12/2016 | Woolward |
| 9,552,477 B2 | 1/2017 | Collado et al. |
| 2009/0222880 A1 | 9/2009 | Mayer et al. |
| 2015/0379287 A1 | 12/2015 | Mathur et al. |
| 2016/0085841 A1 | 3/2016 | Dorfman et al. |
| 2016/0092678 A1* | 3/2016 | Probert .............. G06F 9/45558 713/193 |
| 2016/0283259 A1* | 9/2016 | Mehta ................. G06F 9/45558 |
| 2017/0279826 A1* | 9/2017 | Mohanty ............ G06F 9/45558 |

OTHER PUBLICATIONS

"International Search Report and Written Opinion Issued in PCT Application No. PCT/US18/029490", dated Jul. 2, 2018, 12 pages.

* cited by examiner

SECURING VIRTUAL EXECUTION ENVIRONMENTS

BACKGROUND

Virtualization has become prevalent for numerous reasons. Machine virtualization has been used to increase utilization of hardware resources, improve security, isolate code, facilitate shifting of workloads among machines, enable incompatible operating systems to execute on a same machine, partition a single machine between tenants, and other reasons. Machine virtualization involves a virtualization layer (e.g., a hypervisor) presenting the hardware of a machine as virtual machines (VMs). Each VM typically has its own virtualized hardware such as a virtual disk drive, virtual processors, virtualized memory, etc. Each VM will usually have a guest operating installed thereon; the guest operating system operates as though it were executing directly on the host machine's hardware and the virtualization layer is transparent to the guest operating system.

Machine virtualization has advantages and disadvantages. One disadvantage is excessive resource overhead. Each VM requires storage. Sharing processing time among VMs requires many expensive context switches. Handling privileged instructions can also incur context switching overhead. Each VM has an entire operating system which can require significant storage. Each VM requires its own memory space. The virtualization layer can itself have a large footprint and of uses processor time just to manage resource sharing. Furthermore, virtual machines also take significant time to create, provision, and start executing. Although migration of a VM between hosts is practical and commonly used, migration requires significant time and network bandwidth.

The shortcomings of machine virtualization have led to a resurgence in container virtualization. Container virtualization involves forming isolation environments (containers) from objects of the host operating system; processes, files, memory, etc. A container engine acts as an abstraction layer between a container and the operating system resources. File system objects, namespaces, registry or configuration data, and the like are logically mapped between the operating system and the container. A container might, for instance, appear to have its own file system, when in fact files in a container namespace are mapped by the container engine to files in the operating system's namespace. A container engine might also regulate how much compute resources are available to containers. For instance, processor time, memory, filesystem size, and other quantifiable resources might be proportionally rationed among containers. A container might also have binaries, libraries, and other objects upon which guest software running in a container might depend. Thus, if the host operating system's kernel is sufficiently compatible with a container engine, the container might provide objects such as libraries that enable the container's guest software to effectively execute in a different version of the host operating system. Containers tend to have faster start times than VMs, lower storage requirements, migrate faster, and require less processing overhead for context switching and processor sharing.

Security has been a concern for all types of secure/isolated guest runtime environments (GREs), whether VMs, containers, or otherwise. An objective of GREs is to allow applications of different provenance to share the same host computer. Naturally, there has been concern and measures taken for security. Containers have been considered less secure than VMs because containers usually run under the purview of a same operating system kernel and share a same memory space. Regardless of the type of GRE, most security efforts have focused on protecting the host from threats originating from within a GRE executing on the host. The thought has been that if the host is protected from malicious activity that might originate from within a GRE, the integrity and security facilities of the host can be relied on to maintain walls between the GREs on the host. In other words, each GRE on a host has been protected by protecting the host environment; as long as the host is not compromised the GRE layer on the host has been assumed to sufficiently secure the GREs. This can be seen in the Docker Engine container implementation. The Docker Engine uses the seccomp facility to limit which system calls can be called from within a container, thus making it more difficult for a container to access or alter objects outside the container.

This host-centric security approach has failed to adequately secure GREs. Because the host environment usually has a higher security level (e.g., kernel-mode) than the GREs themselves (e.g., user-mode), GREs are inherently vulnerable to the host environment. Even an uncompromised host environment has the potential to alter the content or behavior of a GRE. What is needed are new ways of securing GREs that focus on internally protecting GREs. New techniques that help secure GREs by limiting what can be done within a GRE are described below. In some cases, even a compromised host environment may have limited ability to in turn compromise or corrupt the GREs that it is hosting and the guest software of the GREs.

SUMMARY

The following summary is included only to introduce some concepts discussed in the Detailed Description below. This summary is not comprehensive and is not intended to delineate the scope of the claimed subject matter, which is set forth by the claims presented at the end.

Facilities are provided to secure GREs. Security policy specifications may be associated with GREs. A GRE's security policy may be specific to the GRE and may also include security policy inherited from higher levels such as a host operating environment. The security policy of a GRE specifies restrictions and/or permissions for activities that may be performed within the scope of execution of the GRE. A GRE's security policy may limit what the GRE's guest software may do within the GRE. Restrictions/permissions may be applied to particular objects such as files, configuration data, and the like. Security specifications may also be applied to execution initiated within a GRE. A GRE's security specification may restrict or permit executable objects (libraries, applications, etc.) from loading and executing within the GRE. The executability or accessibility of objects may be conditioned on factors such as the health/integrity of the GRE, the host system, requested files, and others.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
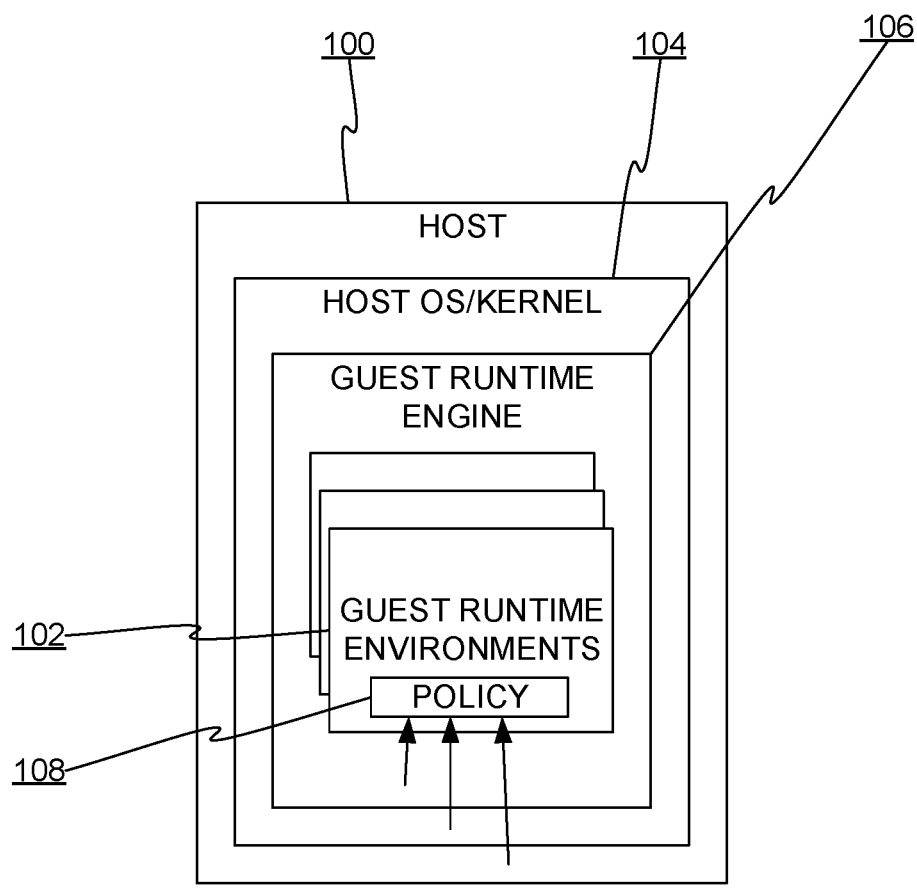
FIG. 1 shows an example of a computing device provided with guest runtime environments (GREs).

FIG. 1 shows an example of a computing device 100 provided with guest runtime environments (GREs) 102. A GRE 102 is an execution environment that isolates the execution of guest software from other objects executing under the host operating system 104. The GREs 102 may be managed by a virtualization layer or guest runtime engine 106 such as a machine virtualization hypervisor, a container engine, or the like. A GRE 102 may be a virtual machine, an execution container, etc.

A GRE 102 is provided with a security policy 108. The security policy 108 is configured to safeguard the execution and/or content of the corresponding GRE 102. As will be described further below, the security policy 108 may include an executing portion and a specification portion. The security specification specifies restrictions imposed by an integration manager (a person who manages the host computer and the GRE infrastructure) and/or by a guest administrator (a person who manages the guest content of the GREs). The security specification for a GRE 102 may instead be defined as part of the application that will be running in the GRE.

In one embodiment, the security specification of the security policy 108 specifies executable units that users can or cannot run in the corresponding GRE virtual environment. The executable units may be specified as applications, libraries, packages, versions, etc. As described further below, the executable units may be specified as hashes (perhaps signed) of corresponding files. Thus, when a file is to be loaded for execution in the GRE, a hash of the file may be computed and compared to a hash in the security specification to determine whether the file is allowed to be executed in the GRE. Even if the requested execution is initiated from outside the GRE the file may still be denied execution. Indicia of execution units may take any form, including file names, package identifiers, hashes, etc.

Other objects besides executable units may also be specified as accessible or not. Configuration data, files, memory segments, registers, network addresses or domains, or other objects may be identified in the security specification. The security specification may also include the types of access permitted/denied for specific objects. In one embodiment, the non-executable objects may be requested, in the GRE, as parameters of applications (e.g., launch parameters), as parameters of system calls, etc. For example, the security specification might include black/white lists of uniform resource identifiers/locators (URIs/URLs). When a URL, for instance, is requested, a corresponding application such as a browser might only be allowed to open the URL if the URL is on a white list (or not on a black list). A whitelist of permissible files can be particularly useful when a GRE contains guest software with a highly specific and limited purpose. A file whitelist would prevent any non-specified files from being opened, written, read, created, and/or deleted.

In embodiments where a GRE is implemented as a virtualization container and executes as a process (preferably user-mode) of the host operating system 104, objects to be restricted/granted may be specified in the namespaces of the container. For example, file or registry locations may be specified with locations/paths presented to the container's guest software by a container engine's filesystem or registry virtualization. Object restriction/access can be enforced within the container engine code that handles the virtualized aspects of containers.

Among the settings that might be denied/granted by the security policy, settings of the GRE itself may also be specified. For example, in the case of a VM-type GRE, the security policy might specify that debugging cannot be enabled. Similarly, some machine virtualization hypervisors implement VM tracing where the instructions and data that are executed/accessed by a VM's virtual processor(s) are captured and stored in a trace file. A security policy may specify that tracing cannot be turned on for the corresponding GRE. Similarly, the security policy can specify security attributes that objects must have before being executed/accessed in a GRE. For instance, the security policy may require any executable code that is requested to execute within a GRE to be signed and verified before it can be executed.

The same approach may be used with non-executable objects, e.g., any file to be opened for reading may need to be verified as authentic or original before being opened. In the case of GREs implemented as containers, such protections can be applied to the container image data such as dependency libraries or other executables or configuration data that are part of the container itself or its virtualization datas. That is, verification can be required for elements of the container image that bridge the gap between the environment of the host operating system and the environment needed by the guest application software.

Combinations of the GRE securement techniques outlined above can provide highly secure environments. A whitelist of the only executable files permitted to be executed in combination with a requirement that all accessed files be verified makes injection of malicious code in to a GRE difficult.

Yet another way the content and behavior of GREs can be protected is by specifying security properties of objects outside of the scope of the GREs. That is, although the intent of a GRE security policy may be to secure the content of a GRE, the GRE internals can be further secured by imposing requirements on the environment providing or hosting the GRE. A trusted entity can be provided by the host, hypervisor, container engine, or equivalent. The trusted entity can be safeguarded by a Trusted Platform Module or other cryptoprocessor. The trusted entity assures that environment outside the GRE is secure and therefore can be trusted to manage execution of the GRE. Any host hardware or software features may be tested against cryptographically stored identifiers, e.g., the operating system type or revision, a signature of the kernel or hypervisor, a trusted boot sequence, etc.

Returning to FIG. 1, the arrows to the policy 108 represent a hierarchical policy embodiment where the policy for a GRE can be a combination of GRE-based policy and host-based policy. In one embodiment, an integration administrator defines a host/hypervisor policy enforced at the host level, i.e., by the host operating system 104. The policy enforced within a GRE may be a combination of a GRE policy and the host policy (or part of the host policy). Any type of policy specification discussed above can be specified in the host-based policy. When a GRE is started or instantiated, the policy that will be enforced for the GRE is built from policies of whichever layers back the GRE. This allows the integration administrator to specify policy for the host as well as the GRE. The guest administrator is authorized to configure the GRE and constructs the GRE's policy specification, and the GRE's policy enforcement enforces policy for both the host and the GRE. This embodiment allows the GRE to have a stricter security policy than the host. This also allows a GRE to adapt a security policy of a new host when the GRE is migrated between hosts, and yet maintain its own GRE-specific policy. More than two layers of policy may be stacked. For example, if the GRE is a container executing within a VM, there may be policy specific to the container, policy specific to the VM, and policy specific to the host or hypervisor. In another embodiment, some of the security policy for a GRE is inherited from secure boot policy. If containers are implemented as compositions of other containers, then the security policies of the GREs that make up a given GRE may also be combined to serve as the effective GRE-level security policy for the composite GRE.

Figure 2:
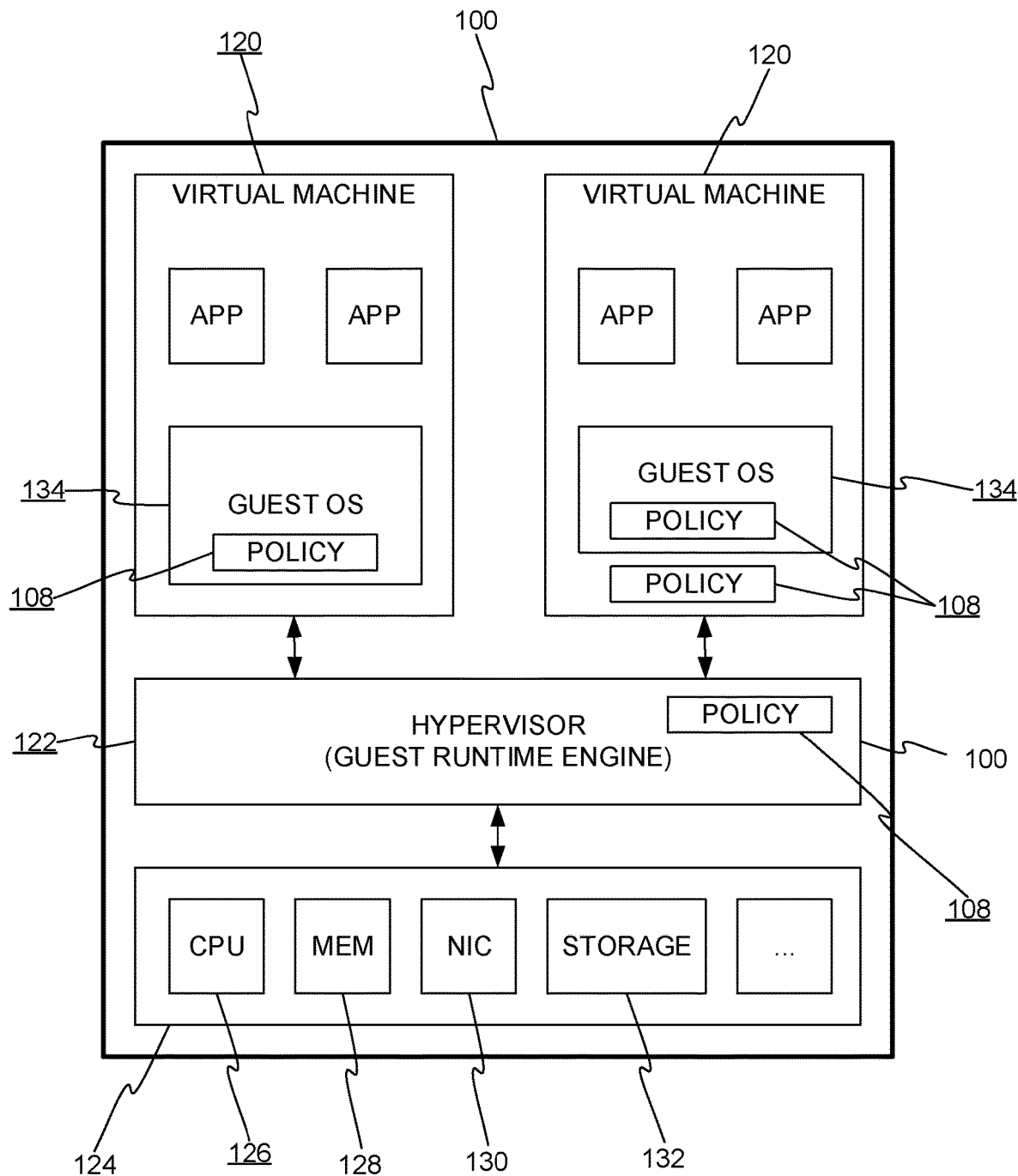
FIG. 2 shows an embodiment where GREs are implemented as virtual machines.

FIG. 2 shows an embodiment where GREs are implemented as virtual machines 120. A hypervisor 122, perhaps in combination with a privileged VM, shares host hardware 124 such as a central processing unit (CPU) 126, memory 128, a network interface 130, and persistent storage 132, among the VMs 120. The hypervisor 122 may be implemented with existing software but augmented as described herein.

The policy 108 in the machine virtualization embodiment may be spread across host, virtualization, and guest layers. At the virtualization/hypervisor layer, policy can be implemented in terms of access to/from VMs by virtual devices, executable modules loadable by the hypervisor, resources accessible from a VM, network restrictions/grants (e.g., firewall rules), etc. It is also possible to implement policy at the VM/partition layer. A policy is associated with a VM and the policy is enforced only against the VM. This policy is enforced between the hypervisor and the guest operating system 134. This policy may be implemented as a filter between the VM and the guest operating system. The VM-level policy may merely be a policy specification that is inherited and enforced by a policy manager executing in the guest operating system 134. That is, the VM-level policy may function as the host-level policy discussed above with reference to FIG. 1. GRE-level policy may be implemented within the guest operating system 134 in the ways described above, i.e., using code verification, object/executable white/black lists, etc.

Figure 3:
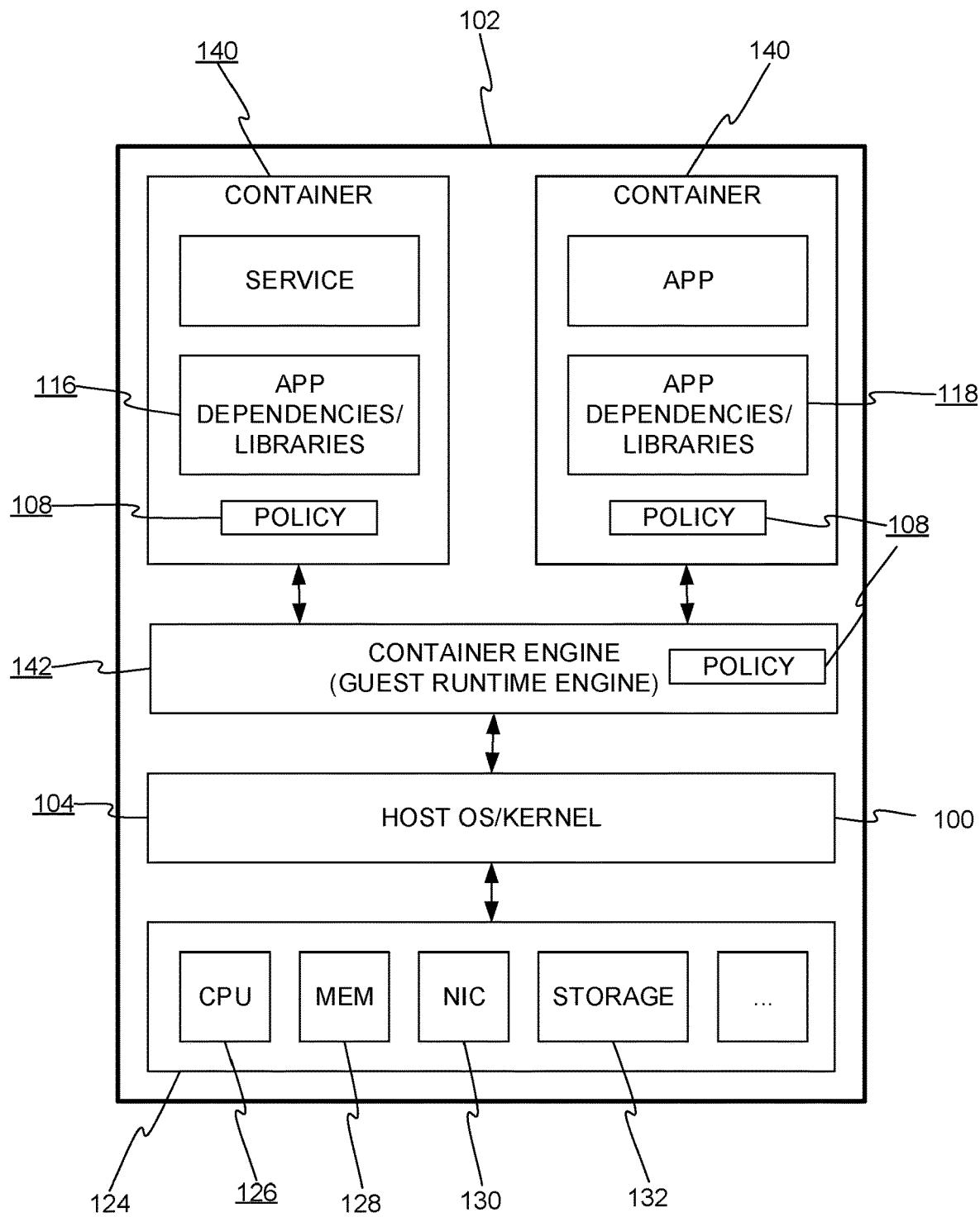
FIG. 3 shows an embodiment where GREs are implemented as containers.

FIG. 3 shows an embodiment where GREs are implemented as containers 140. In this embodiment, as discussed in the Background, the GRE/container typically executes as a process of the host operating system/kernel 104. A container engine 142 virtualizes various operating system objects used by the guest application/service that executes within a container 140, for example by translating between container namespaces and respective operating system namespaces. The container engine 142 may also perform management functions such as starting and stopping containers, saving the state of containers, managing the images encapsulated in containers, layering containers, etc. The Docker Engine is an open source project that may be extended with security policy features as described herein.

As discussed above, policy may be implemented in part above the GRE/container layer. In addition, the container engine 142 itself is a point where policy can be specified and enforced. This allows policy to be specified and enforced for all containers managed by the container engine 142. Each container 140 may have its own policy in addition to or instead of a policy for all containers. As discussed above, the policy enforced for a container may be a union of policies that pertain to the container, including host, container engine, and/or container policy. As also discussed above, the policy for a container may specify objects that may or may not be accessed and executables that may or may/not be executed within a container.

Figure 4:
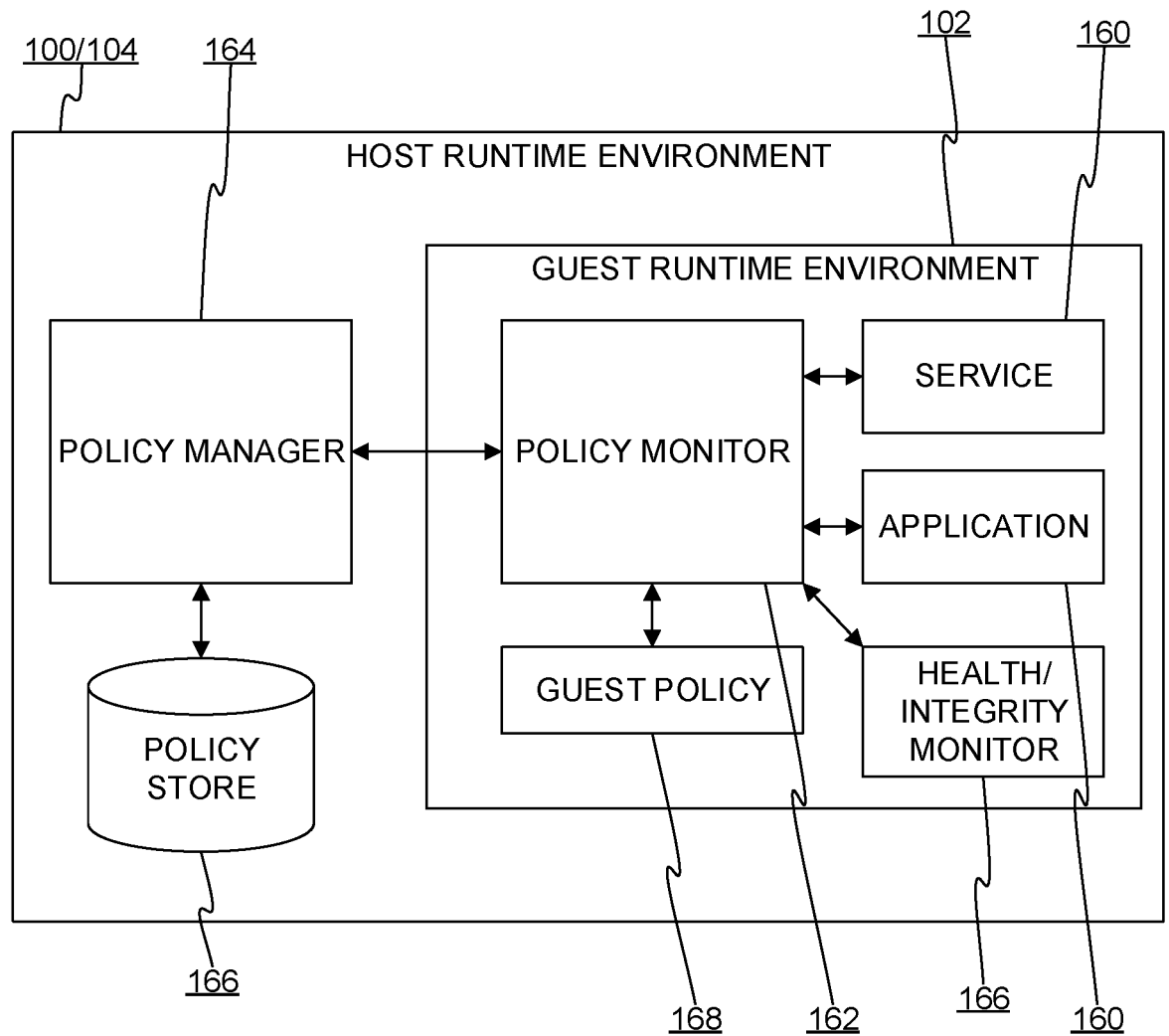
FIG. 4 shows components for policy enforcement.

FIG. 4 shows components for policy enforcement. The components in FIG. 4 may be implemented in either a hypervisor-based embodiment or a container-based embodiment. For convenience, the components will be described as applied to containers. The GRE 102 hosts guest software such as a service and/or application 160. The GRE 102 also includes a policy monitor 162. The policy monitor 162 may be a thread launched by the container process or a child process of the container process. The policy monitor is in communication with a policy manager 164 that executes outside of the scope of the container/GRE 102. The policy manager 164 and policy monitor 162 may communicate using any type of interprocess communication. The GRE 102 may also have a health monitor 166. The policy manager 164 accesses a policy store 166. The policy store 166 may include any policy not specific to the GRE, as discussed above. In another embodiment, the policy manager 164 may supply some of the policy to be enforced by the policy monitor 162. The policy monitor 162 reads GRE-specific policy from a store of guest policy 168.

Figure 5:
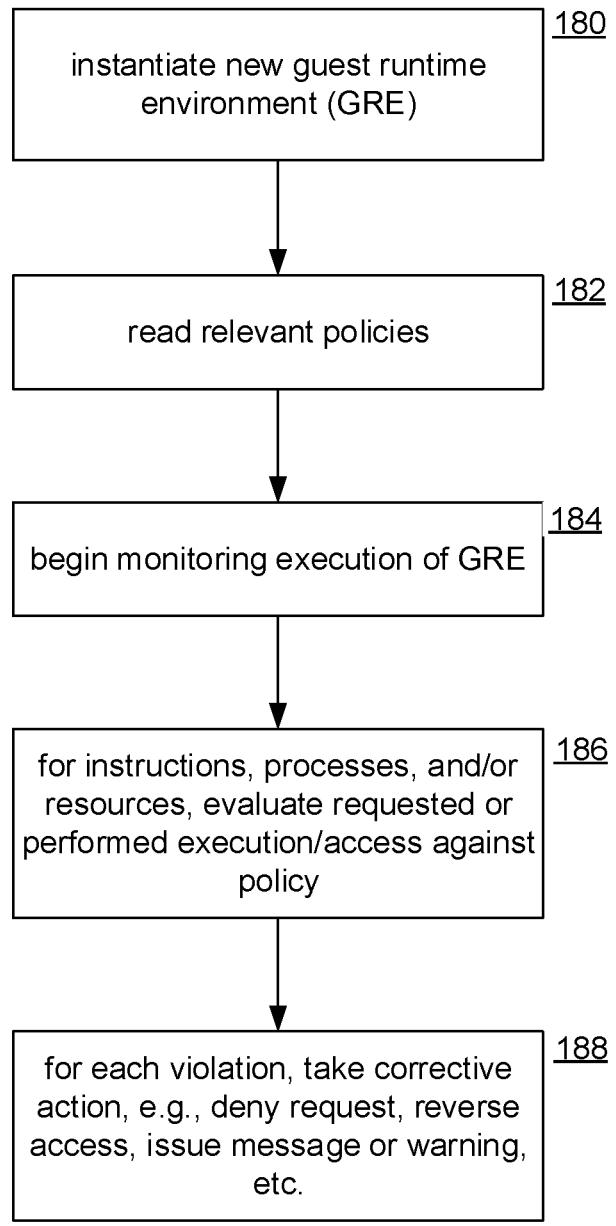
FIG. 5 shows a general process corresponding to FIG. 4 for enforcing the policy of the GRE.

FIG. 5 shows a general process corresponding to FIG. 4 for enforcing the policy of the GRE 102. The GRE is assumed to be configured and ready to execute, including the GRE-specific security specifications stored in the guest policy 168. At step 180 the GRE is started and begins executing. At the same time, or just before, the policy monitor 162 reads the guest policy 168 and loads the rules into memory. The integrity of the guest policy 168 may also be verified and if the guest policy is not verified then the GRE is halted and not permitted to execute. At step 184 the policy monitor 162 begins monitoring execution of the GRE. The monitoring or policy enforcement is described below.

At step 186 the monitoring evaluates instructions to execute new processes, access resources, and the like. These requests are evaluated against the requirements in the guest policy 168. At step 188 any violations that are detected trigger corresponding corrective actions. The corrective actions may be configured in the guest policy 168 or may be based on the nature of the rules violated or the type of object being requested.

The corrective action may be reversing an access to a resource, denying the corresponding request, issuing a warning message or a signal outside the GRE which in turn triggers corrective action outside the GRE. For example, the policy manager 164 might be notified of a violation and the policy manager 164 takes some action. Alternatively, the policy monitor 162 may invoke a call provided by an API of the guest runtime engine 106. For instance, if the guest runtime engine 106 is a hypervisor then the policy monitor 162 may request the hypervisor to halt the GRE, take a checkpoint of the GRE, undo execution of the GRE that proceeded the violation, etc. If the guest runtime engine 106 is a container engine, then similarly the policy monitor 162 may terminate the GRE/container, undo, or discard any pending changes to the GRE or the GRE's guest software, or the like.

In one embodiment, the policy monitor 106 includes a shim, hooks, or other means to associate security checks with resource requests that originate within the GRE. To regulate execution of code, process creation calls may be secured. Any time a create-process, fork, exec, spawn, load-library, or similar call/function for creating a new process or thread or loading new executable code into newly allocated executable memory is invoked from within the GRE (usually, by the GRE's guest software), the target of the call is evaluated against the GRE's policy. This may involve any of the techniques discussed above, including verifying the identity and integrity of the target, determining if the target is permitted/banned by the GRE's policy in the guest policy 168, or similar security specifications.

Other attempts to access or modify resources may be similarly monitored. Attempts to access hardware resources or services may be monitored. File system requests may be evaluated. Calls to network resources may be restricted in firewall-like fashion based on addresses, ports, or protocols. Access to resources from within the GRE may also be monitored and blocked based on quantitative restrictions. The guest policy 168 (or inherited external policy) can specify limits on how many CPU cores are available, what frequency they may operate at, network bandwidth consumption, how many applications/threads/services may run at one time, a maximum proportion of total processing power to be consumed, and so forth.

As discussed above, GRE security may also or alternatively be improved with an integrity monitor 166. The integrity monitor 166 monitors the state of the GRE during its execution. File hashes of the GRE and/or the guest software are regular checked, resource usage is evaluated, registry entries or settings, among others. The integrity monitoring may check the status of objects at arbitrary times instead of when requested. The integrity monitor 166 communicates inconsistencies or integrity failures to the policy monitor 162. The policy monitor 162 conditions access to resources such as files and configuration data or loading of new executable code only if the GRE has passed the heath evaluation of the integrity monitor 166.

Figure 6:
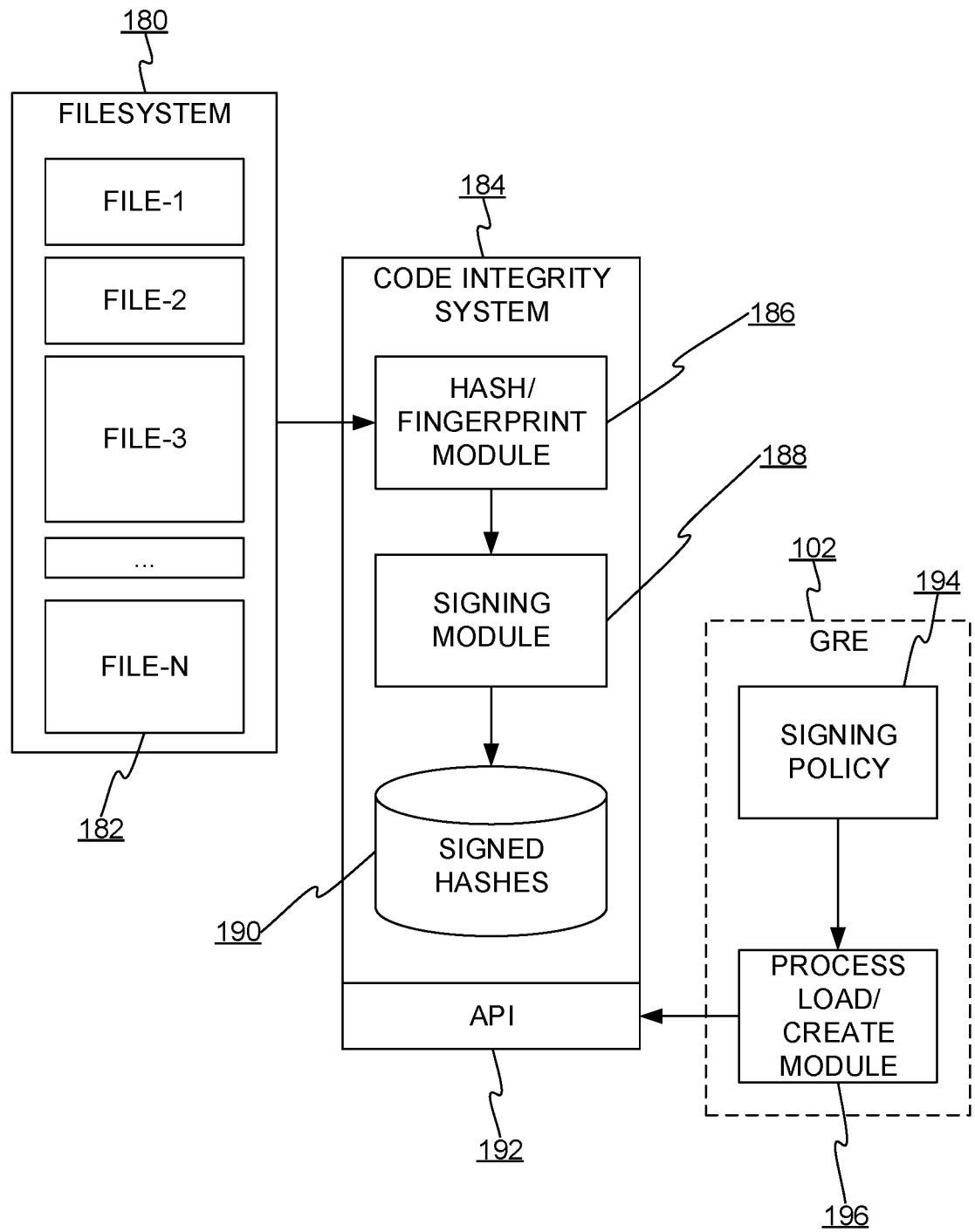
FIG. 6 shows how file hashes or signatures can be used for securing GREs.

FIG. 6 shows how file hashes or signatures can be used for securing GREs. A file system 180 is managed by the host operating system. The file system 180 stores files 182. A code integrity system 184 includes a hashing module 186 and a signing module 188. The hash module 186 computes hashes for the respective files 182 and the signing module 188 signs the hashes. The signed hashes are stored in a catalog 190 in association with the full file names of the files 182. An API 192 can be used to check the integrity of a file 182. When a file name is passed through the API 192, the hash module 186 computes a hash for the named file. The corresponding file's hash stored in the catalog 190, if its signature is verified, is compared to the computed hash, and if the hashes match the integrity of the named file is verified.

A GRE 102 may use the code integrity system 184 in the following way. The GRE 194 includes a signing policy 194, which may be part of the guest policy. A process load/create module 196 consults the signing policy 194 each time a file is to be loaded for execution in the GRE. If the signing policy 194 indicates that the file to be loaded must checked, then an indication of the file requested for loading/execution is passed to the API 192. The file's integrity is checked as described above and if the file's integrity is verified then executable memory is allocated and the process load/create module 196 loads the file into the new executable memory.

File integrity checking may be combined with file white/black listing within the GRE. In this way, which files may be executed in the GRE is controlled, and even if a file is permitted to be executed, execution is conditioned on the file passing an integrity check. The code integrity checking can also be used to restrict execution to only files that are signed by a certain publisher, which can be helpful when anti-virus software is not running in the GRE (as is often the case).

In some cases, the code integrity policy will support forwarding. For example, the host may be a highly secure environment and the container/GRE is less secure. The container allows access to public websites and enables the user to open unwanted attachments. The container may also run unknown or potentially malicious executables. In this example, the user acquires these executables via attached storage, and the file is on the host. When the user tries to launch this executable on the host, the same monitoring method above is applied, however when a create-process function is called, this executable is forwarded into the container. In some scenarios, as the executable has never been run, this will launch the installation in the container and the user will be able to use the executable in an isolated environment. Note that some executables have a non-deterministic set of dependencies and may not run using this method.

In one embodiment code integrity policy is added to the container by adding the code integrity policy to a registry of a base image of a container before the container is instantiated. Alternatively, code integrity policy is inserted during initial machine configuration while booting a container. Yet another technique is to add code integrity to a container's pre-boot environment as a Unified Extensible Firmware Interface (UEFI) variable so it can be read by the code integrity service inside the container. Finally, during boot the container code integrity service explicitly reaches out to the host code integrity service to ask for the code integrity policy that the container needs to enforce. These policy-providing techniques can also be used for any policy or settings that need to be transferred to a container from the host.

Figure 7:
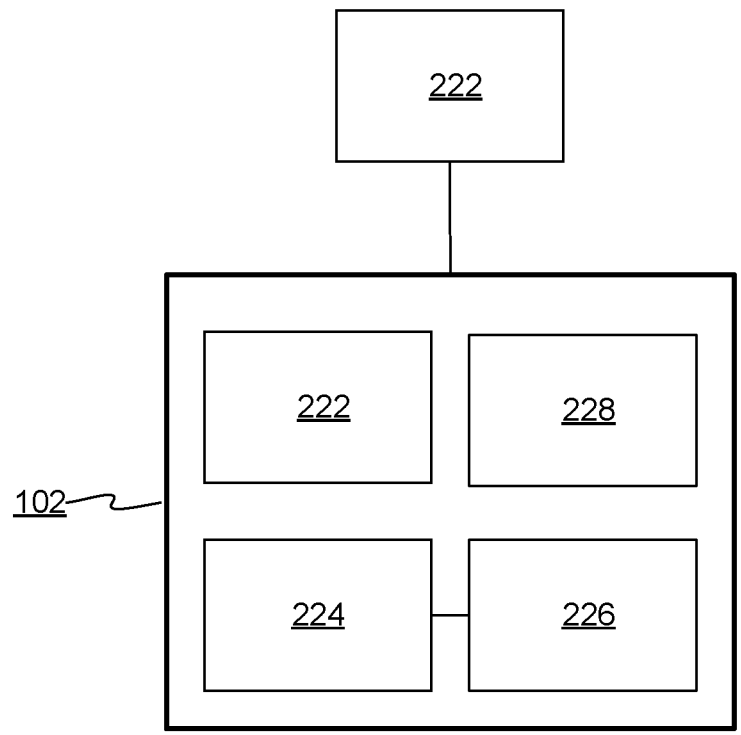
FIG. 7 shows a computing device.

FIG. 7 shows details of the computing device 100 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 100 to implement any of the features or embodiments described herein.

The computing device 100 may have display(s) 222, a network interface 228, as well as storage hardware 224 and processing hardware 226, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 224 may be any combination of magnetic storage, static memory, volatile memory, non-volatile memory, optically or magnetically readable matter, etc. The meaning of the terms "storage" and "storage hardware", as used herein does not refer to signals or energy per se, but rather refers to physical apparatuses and states of matter. The hardware elements of the computing device 100 may cooperate in ways well understood in the art of machine computing. In addition, input devices may be integrated with or in communication with the computing device 100. The computing device 100 may have any form-factor or may be used in any type of encompassing device. The computing device 100 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 226. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

CONCLUSION

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a host computing device comprising processing hardware and storage hardware, the method comprising:
   executing a host operating system, the host operating system executing a guest runtime environment (GRE) engine, the GRE engine configured to instantiate and manage the execution of GREs, each GRE comprising an environment that isolates execution within the GRE from the host operating system and from other GREs;
   providing a security policy for a GRE managed by the GRE environment, the security policy specifying execution restrictions to be imposed on code executing within the GRE; and
   enforcing the security policy with respect to the GRE by monitoring execution of code within the GRE against the security policy and enforcing the execution restrictions when they are determined to be applicable, the monitoring comprising evaluating executable code for compliance with the security policy when the executable code has been requested to be loaded for execution by the GRE, the enforcing comprising preventing the GRE from loading executable code into memory for execution when the executable code has been determined to not comply with the security policy.

2. A method according to claim 1, wherein the GRE engine comprises a machine virtualization hypervisor, and wherein the GREs comprise respective virtual machines.

3. A method according to claim 1, wherein the GRE engine comprises a container engine and the GREs comprise respective containers, each container comprising a respective process managed by the container engine, each container comprising a sandbox of files and configuration data.

4. A method according to claim 1, further comprising:
   storing hashes of respective executables, the executables stored by the storage hardware, the executables executable as processes by the operating system and/or the GRE engine, wherein the execution restrictions comprise one or more of the hashes, and wherein the monitoring comprises comparing the one or more hashes of the execution restrictions with hashes of executables requested to execute in a GRE.

5. A method according to claim 4, wherein the comparing is performed for an executable that is requested to be executed in the GRE or is performed for an executable that is already executing in the GRE.

6. A method according to claim 1, further comprising implementing a host-level security policy that governs the host operating system, and implementing the host-level security policy, at least in part, within a GRE.

7. A method according to claim 1, further comprising executing a loader that loads executable files and/or libraries for a GRE by, each time a file and/or library is requested to be loaded for execution, determining whether the requested file and/or library is authorized to execute within the GRE.

8. A computing device comprising:
   processing hardware;
   storage hardware storing instructions configured to cause the processing hardware to perform a process, the process comprising:
      executing guest runtime environment (GRE) engine that creates and executes GRE instances, each GRE instance comprising an isolated execution environment wherein files and/or memory of each GRE instance is isolated by the GRE engine;
      providing a plurality of security policies associated with respective GRE instances;
      executing a policy monitor in a GRE instance, the policy monitor accessing a security policy specific to the GRE instance, the policy monitor monitoring requests, within the GRE instance, to load executable files from file storage in the GRE into memory for execution, the policy monitor determines whether the requests are authorized based on whether the executable files requested for execution are specified by the security policy; and
      notifying an enforcement module when a request for execution of a file is not authorized.

9. A computing device according to claim 8, wherein the enforcement module either prevents execution of the file, terminates execution of the file, or issues a notification indication violation of the security policy.

10. A computing device according to claim 8, wherein the process further comprises computing hashes of the files requested for execution to determine whether the files are authorized for execution in the GRE instance.

11. A computing device according to claim 8, wherein the process further comprises accessing a host-based policy that governs execution policy outside of the GRE engine.

12. A computing device according to claim 11, wherein the process further comprises applying at least a portion of the host-based policy by the policy monitor in the GRE instance.

13. A computing device according to claim 11, wherein the process further comprises determining, based on the host-based policy, to instantiate the GRE instance.

14. A computing device according to claim 13, wherein the process further comprises responding to a request to execute an application by evaluating the host-based policy to determine to instantiate the GRE instance.

15. A computing device according to claim 8, wherein the GRE instance comprises a virtualization container or a virtual machine.

16. A computing device according to claim 8, wherein the GRE instance comprises a container that comprises a user-space process managed by an operating system of the computing device, and wherein the GRE engine performs the enforcing of the security policy.

17. Computer storage hardware storing information configured to enable a computing device to perform a process, the process comprising:
　managing execution of guest runtime environments (GREs) on the computing device, the managing including virtualizing access to hardware of the computing device by guest software executing in the GREs;
　associating a security policy specification with a GRE, the security policy specification specifying objects within the GRE and specifying respective security restrictions to be enforced within the scope of execution of the GRE;
　enforcing the security policy specification by monitoring requests to access objects stored within the GRE, determining whether the objects requested to be accessed correspond to the objects specified by the security policy specification, and when so determined, determining whether the requests to access the specified objects satisfy the restrictions in the security policy specification; and
　determining whether to grant or deny access to the objects within the GRE based on the monitoring.

18. Computer storage hardware according to claim 17, wherein the monitoring further comprises checking the integrity of the objects, the GRE, or a host operating system hosting the GREs.

19. Computer storage hardware according to claim 18, the process further comprising receiving a host policy specification associated with a host operating system and performing the monitoring in accordance with the host policy specification.

20. Computer storage hardware according to claim 17, wherein the GRE comprises a container, wherein the policy specification comprises a code integrity policy, and wherein the code integrity policy is added to the container either by (i) adding the code integrity policy to a registry of a base image of a container before the container is instantiated, (ii) by inserting the code integrity policy into the container during an initial configuration while booting a container, (iii) by adding code integrity to a container's pre-boot environment as a Unified Extensible Firmware Interface (UEFI) variable, or (iv) by the container requesting the code integrity policy.

* * * * *